J. F. O'CONNOR.
SHOCK ABSORBER.
APPLICATION FILED NOV. 30, 1914.
1,181,920.
Patented May 2, 1916.
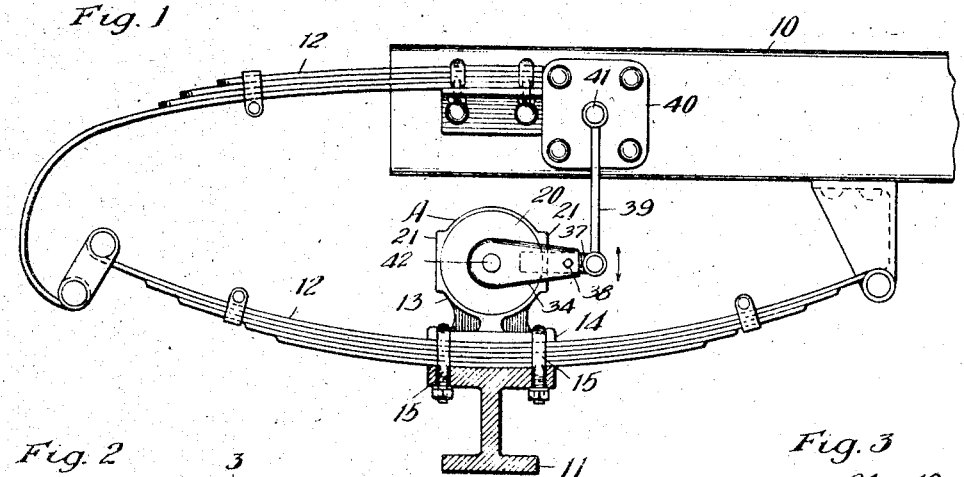
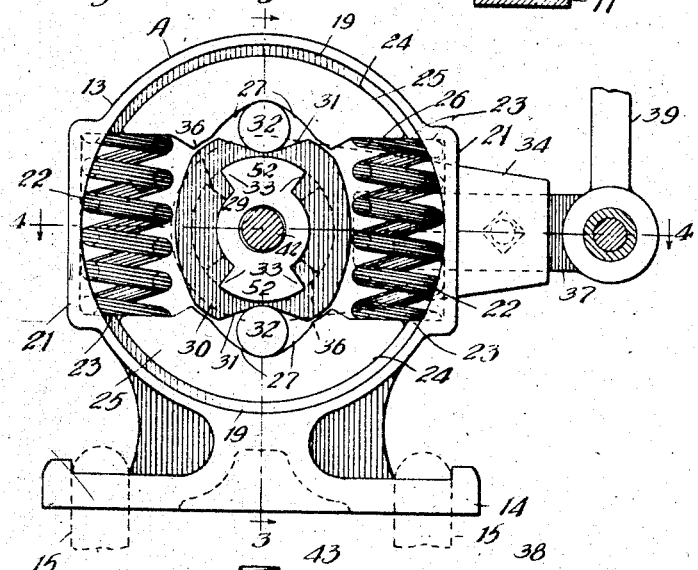
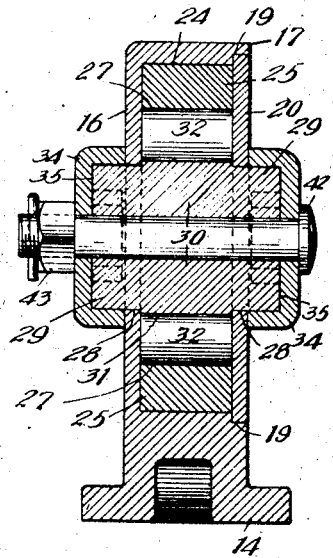
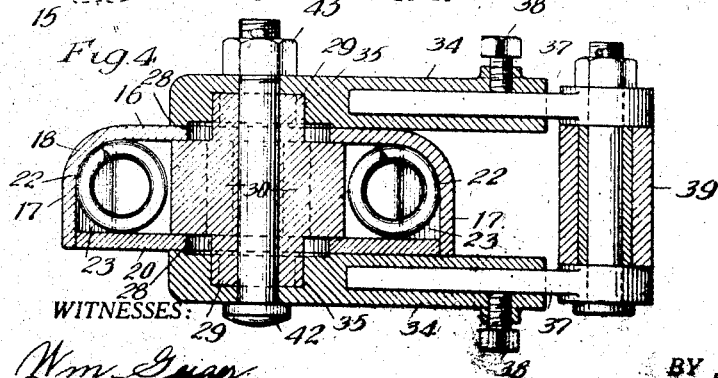
WITNESSES:
INVENTOR.
John F. O'Connor
BY George T. Haigh
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

SHOCK-ABSORBER.

1,181,920.

Specification of Letters Patent.

Patented May 2, 1916.

Application filed November 30, 1914. Serial No. 874,693.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbers, of which the following is a full, clear, concise, and exact description, reference being had to the accompanying drawings, forming a part of this specification.

This invention relates to improvements in shock absorbers.

An object of the invention is to provide a shock absorber compact in its arrangement and of durable and efficient construction.

Another object of the invention is to provide a shock absorber more particularly adapted for vehicles such as automobiles and which employs a frictional arrangement adapted to act in both directions.

The invention furthermore consists in the improvements in the parts and devices and in the novel combinations of the parts and devices, as herein shown, described or claimed.

In the drawing forming a part of this specification, Figure 1 is a side elevation of a portion of an automobile chassis and springs, with my improved shock absorber attached thereto, the axle being shown in section. Fig. 2 is a side elevation of the shock absorber proper showing the interior arrangement thereof, the side plate having been removed. Fig. 3 is a vertical sectional view taken on the line 3—3 of Fig. 2 and Fig. 4 is a horizontal sectional view taken on the line 4—4 of Fig. 2.

In said drawing, 10 denotes a portion of the vehicle frame or chassis, 11 an axle thereof and 12 a spring interposed between the axle and chassis and suitably attached to both, said spring acting in the usual manner to cushion relative approaching movement of the chassis and axle.

The improved shock absorber is designated generally by the reference A and, as shown, comprises a casting 13 having a base flange 14 by which it is adapted to be secured to the lower portion of the spring and axle 11 by clamps 15. At its upper portion, the casting 13 is formed with a rear wall 16 and circular flange 17, the wall 16 and flange 17 being cast integrally and united by a curved portion 18. At the top and bottom thereof, the outer edge of the flange 17 is cut away as indicated at 19—19 to thereby provide a seat for a cover or side plate 20. At the sides, the flange 17 is provided with offset portions 21—21 in which are arranged to be seated springs 22—22, the latter having their ends seated against the shoulders 23—23 formed by the offsets 21. The inner side of the circular flange 17 at the top and bottom thereof forms friction surfaces 24 with which coöperate friction shoes 25, each of said shoes 25 having shoulders 26 at the ends thereof seating against the ends of the springs 22. Each of said friction shoes is also provided on its inner face with oppositely arranged wedge acting surfaces 27.

The rear wall 16 and the cover plate 20 are provided with circular holes 28—28 through which extend bosses 29—29 formed on the opposite sides of a wedge 30 which wedge is provided at the top and bottom thereof with a pair of oppositely arranged wedge acting faces 31—31. Anti-friction rollers 32—32 are interposed between the wedge acting faces 31 of the wedge and the wedge faces 27 formed on the inner sides of the friction shoes. Each boss or lateral extension 29 has upper and lower abutments 52—52, each abutment 52 having a pair of oppositely arranged shoulders 33. For oscillating the wedge, a pair of lever arms 34 are provided on opposite sides of the casting 13, each of said lever arms 34, on the inner side thereof being recessed as indicated at 35 to receive the bosses 29 therein, the recesses 35 being provided with sets of shoulders 36—36 which are normally spaced from the shoulders 33 as indicated most clearly in Fig. 2. The lever arms 34 are hollowed out to receive adjustable extensions 37, the latter being held in place by set screws 38. Pivotally connected to the extensions 37 is a link 39 which is pivotally attached to the chassis 10 by a plate 40 as indicated at 41. The lever arms 34 are held in place by means of a bolt 42 and nut 43 thereon, which bolt is extended through suitable perforations in said arms and a central hole through the wedge 30.

The operation of the device is as follows: When the chassis moves toward the axle 11, the lever arms 34 will be oscillated downwardly but during the first portion of this movement the wedge 30 will not be acted upon inasmuch as the lever arms 34 are free to move independently of the wedge an amount corresponding to the normal space between the shoulders 36 and shoulders 33. This amount of free movement may be varied as desired, but preferably I make the same such that the chassis and axle approach each other about an inch before the wedge 30 is brought into play. Upon movement greater than an inch, it is apparent that the wedge 30 will be oscillated clockwise as viewed in Fig. 2 thus causing the antifriction rollers 32 to be wedged between two sets of coöperating wedge faces 31 and 27. This action will increase the pressure between the friction surfaces of the friction shoes and the inner face of the circular flange 17 and circumferential movement of the friction shoes will be yieldingly resisted by the springs 22, one end of each spring being engaged by a friction shoe and the other end of the spring being held by a shoulder 23. Similarly, on the recoil or separation of the chassis from the axle the shock absorber comes into play after the chassis and axle have separated more than the predetermined amount, namely, an inch in preferable construction. The action of the shock absorber on the recoil is the same as previously described except in the reverse direction.

From the preceding description it will be seen that the shock absorber is exceedingly compact and can be applied to practically all types of automobiles and the arrangement is such that by varying the space between the shoulders 33 and 36, the shock absorber may be brought into play at any desired time although preferably the design is such that with a normal load, the chassis may move up or down one inch relatively to the axle without actuating the friction elements, further movement in either direction operating the friction elements as hereinbefore described.

Although I have herein shown and described what I now consider the preferred embodiment of my improvements, yet it will be apparent that changes and modifications may be made without departing from the spirit of the invention and all such changes and modifications are contemplated as come within the scope of the claims appended hereto.

I claim:—

1. A shock absorber of the character described comprising, a friction shell, friction shoes within said shell and arranged to move circumferentially thereof, said shoes having wedge acting faces, an oscillatable wedge within said shell and between said shoes, said wedge having double acting wedge faces corresponding to the wedge faces of said shoes, and rollers interposed between the sets of wedge faces.

2. A shock absorber of the character described, comprising a friction shell, friction shoes coöperable therewith, said shoes having wedge acting faces, springs interposed between the ends of said shoes and forcing the same apart and into engagement with the friction surface of the shell, a wedge, and rollers interposed between said wedge and the wedge acting faces of said shoes.

3. A shock absorber of the character described comprising, a friction shell, friction shoes within said shell and arranged to move circumferentially thereof, springs interposed between the ends of said shoes and normally forcing the latter into engagement with the friction surface of said shell, an oscillatable wedge between said shoes, said shoes and wedge having corresponding wedge acting faces, and anti-friction rollers interposed between said wedge acting faces.

JOHN F. O'CONNOR.

Witnesses:
CARRIE G. RANZ,
ELIZABETH M. BRITT.